Figure 1:
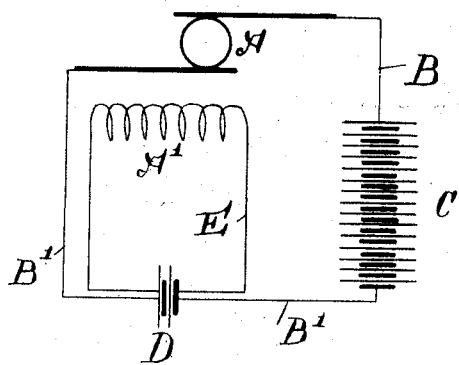

No. 632,874. Patented Sept. 12, 1899.
H. LEITNER.
CONTROLLING OF ELECTRIC MOTOR VEHICLES.
(Application filed Sept. 27, 1898.)

(No Model.) 5 Sheets—Sheet 1.

Witnesses
Inventor:
Henry Leitner

No. 632,874. Patented Sept. 12, 1899.
H. LEITNER.
CONTROLLING OF ELECTRIC MOTOR VEHICLES.
(Application filed Sept. 27, 1898.)

(No Model.) 5 Sheets—Sheet 3.

Witnesses
Inventor:
Henry Leitner
By
his Attorneys.

No. 632,874. Patented Sept. 12, 1899.
H. LEITNER.
CONTROLLING OF ELECTRIC MOTOR VEHICLES.
(Application filed Sept. 27, 1898.)
(No Model.) 5 Sheets—Sheet 4.
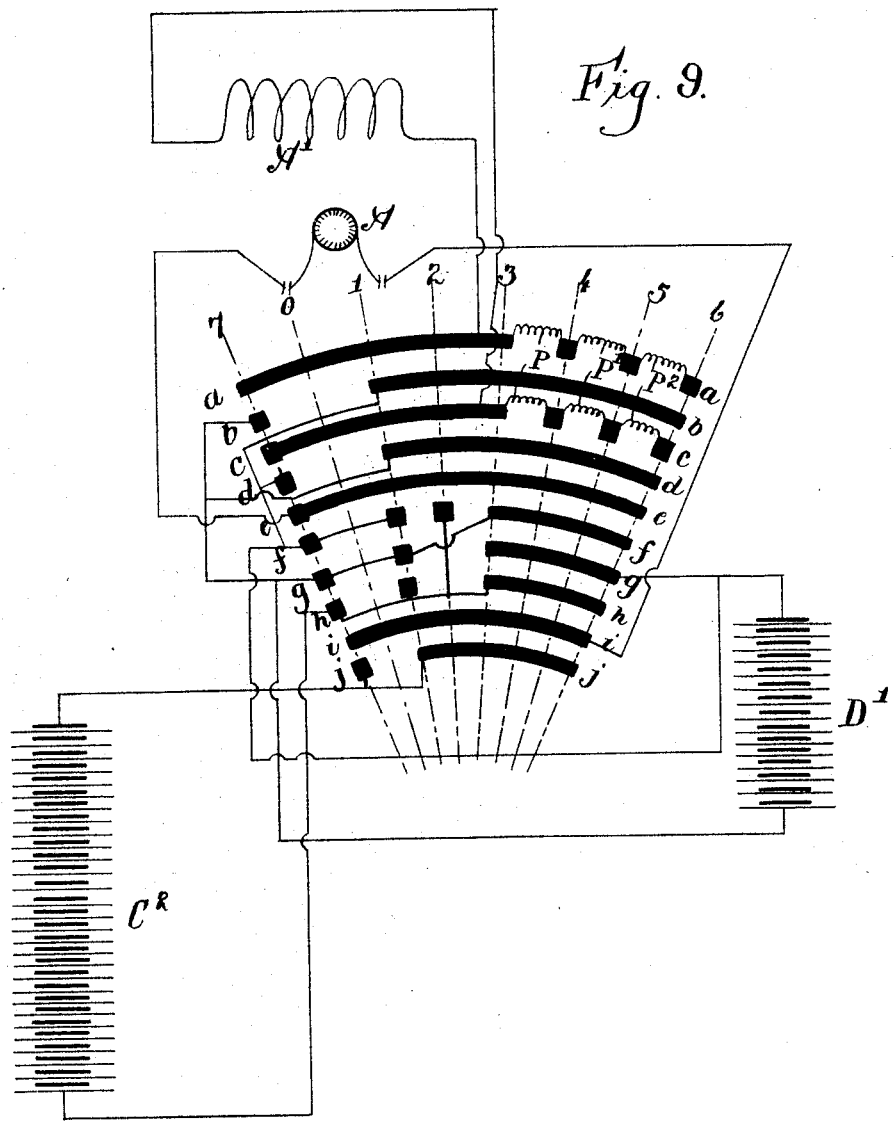
Fig. 9.
Witnesses
Inventor:
Henry Leitner
By 
his Attorneys.

No. 632,874. Patented Sept. 12, 1899.
H. LEITNER.
CONTROLLING OF ELECTRIC MOTOR VEHICLES.
(Application filed Sept. 27, 1898.)
(No Model.) 5 Sheets—Sheet 5.
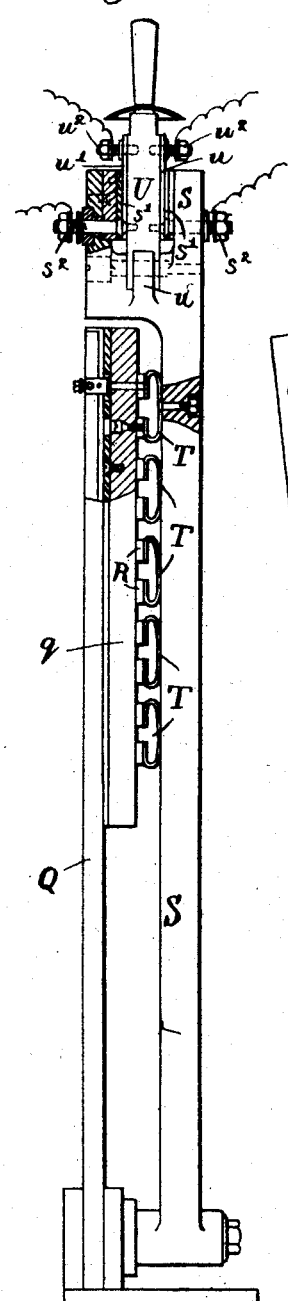
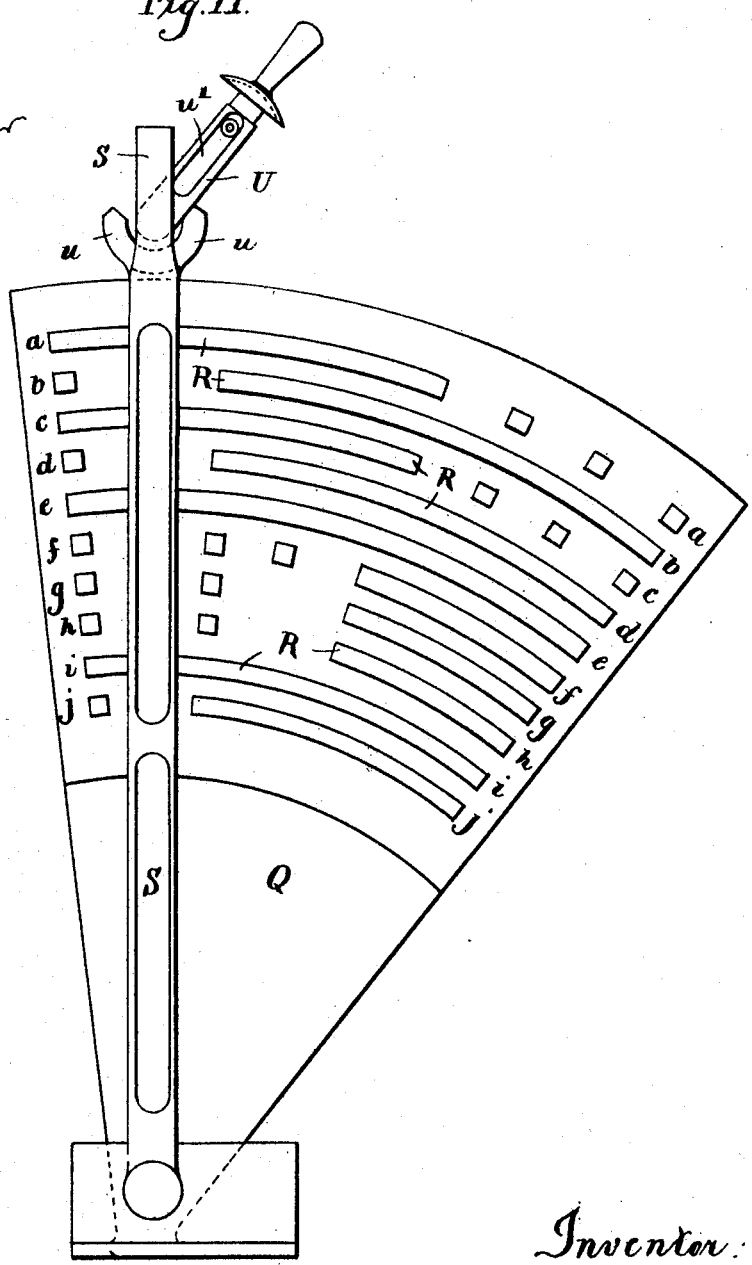

UNITED STATES PATENT OFFICE.

HENRY LEITNER, OF LONDON, ENGLAND, ASSIGNOR TO THE ELECTRICAL UNDERTAKINGS, LIMITED, OF SAME PLACE.

CONTROLLING OF ELECTRIC-MOTOR VEHICLES.

SPECIFICATION forming part of Letters Patent No. 632,874, dated September 12, 1899.

Application filed September 27, 1898. Serial No. 692,021. (No model.)

*To all whom it may concern:*

Be it known that I, HENRY LEITNER, electrical engineer, a subject of the Queen of Great Britain and Ireland, residing at 207 Piccadilly, London, W., England, have invented certain new and useful Improvements in the Controlling of Electric-Motor Vehicles, of which the following is a specification.

This invention relates to improvements in the means for controlling electric-motor vehicles and provides an arrangement which has the following advantages: The greatest possible torque is obtained at starting the vehicle and whenever great resistance is to be overcome; no waste of energy takes place through heating the field-magnet coil, such as occurs in series motors; the energy of the vehicle in descending a hill is absorbed by the accumulators and thus utilized in checking the speed to its normal limits, and the stored energy is then again available for propulsion; undue rush of current in the armature is prevented, and the resistance opposed to the main current is reduced to the lowest possible limit.

The essential feature of the invention consists in the grouping of the motor and battery in a peculiar manner.

Two batteries are employed, one considerably larger than the other, the smaller battery being arranged to supply the field-magnet, so as to keep the magnet constantly near saturation-point, except under special circumstances hereinafter described. The main battery supplies the armature and is also connected to the smaller battery, so as continually to charge the latter, while at the same time this is discharging through the field-magnet coils.

The whole apparatus is arranged so that the motor will act as a dynamo on the vehicle going downhill or on its increasing in speed beyond that set by the controller. The motor thus not only acts automatically as a brake to keep the speed constant, but also sends the current back into the main battery and charges it. The energy of the car in traveling downhill is thus not wasted, but is stored electrically in the accumulator.

The arrangement provides a double path for the current from the main battery, so that should the exciter become exhausted or internal contact broken in any way the current will pass directly through the field-magnet coils. The motor will in this case act temporarily as a series motor. The motor really combines three methods of excitation of the field-magnets and acts as a series motor, a shunt-motor, and an independently-excited motor.

In order that the invention may be more readily understood, reference is had to the accompanying sheets of drawings, in which—

Figure 2:
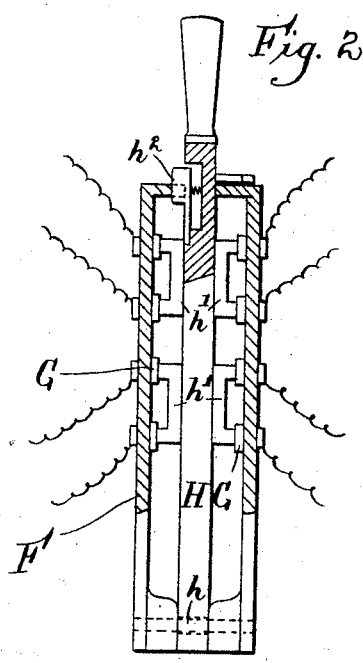
Figure 3:
Figure 4:
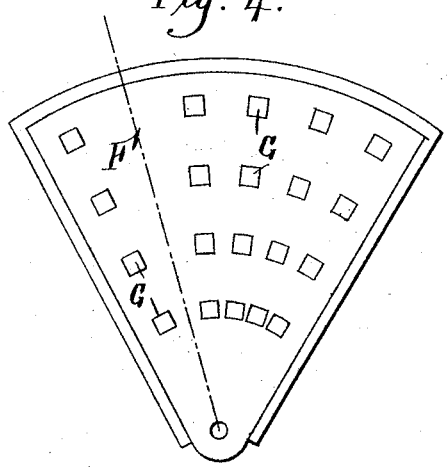
Figure 5:
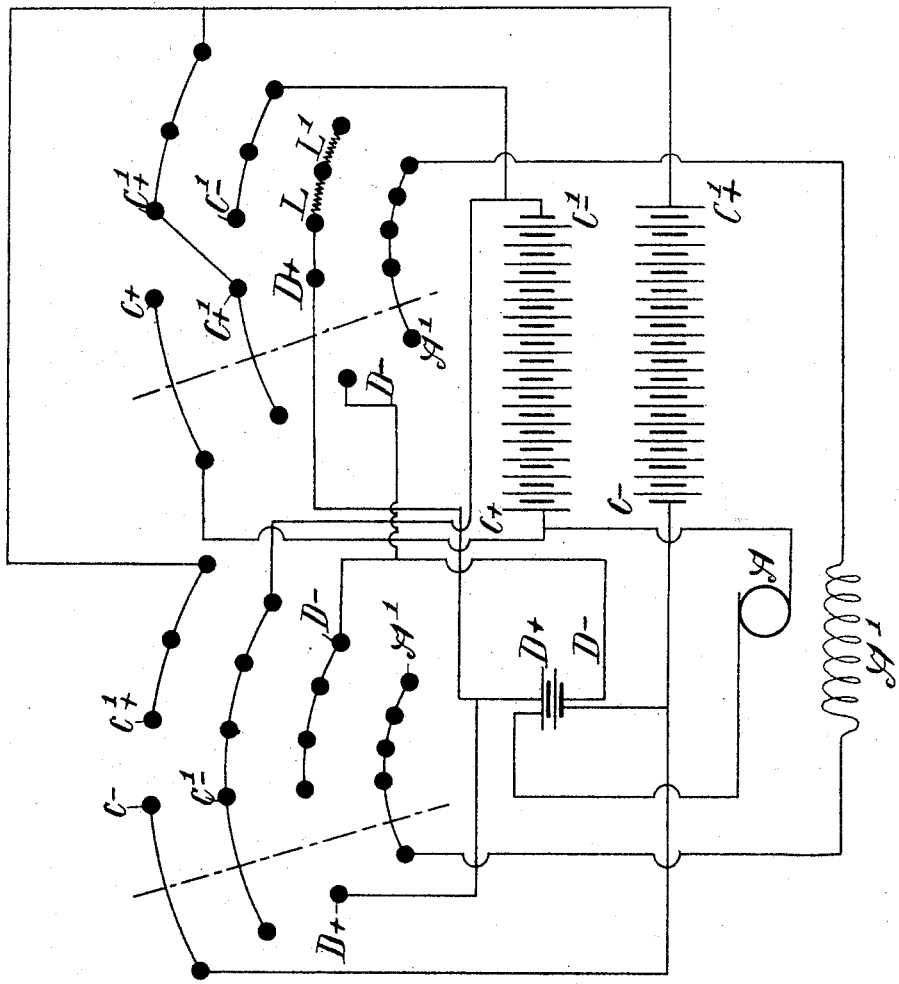
Figure 6:
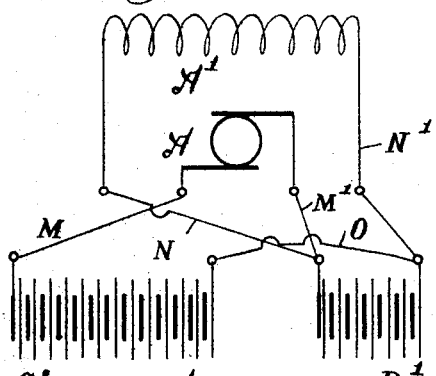
Figure 7:
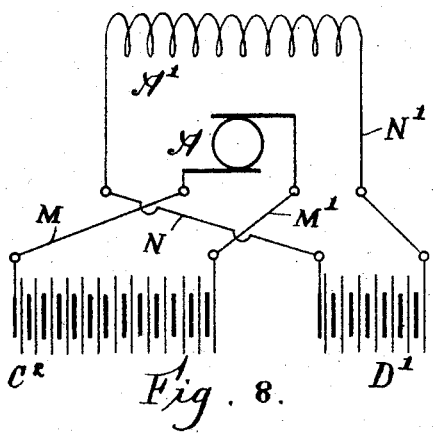
Figure 8:
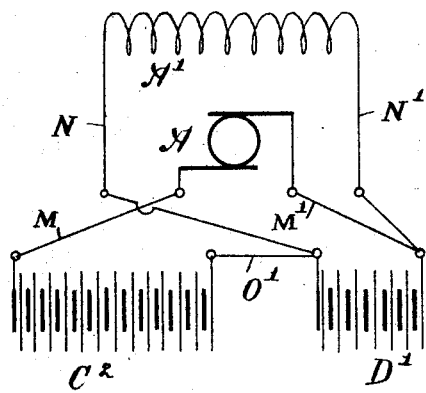

Figure 1 is a diagrammatic view of the general arrangement. Fig. 2 is a side view of the controlling apparatus used in connection with the arrangement shown in Fig. 1. Fig. 3 is a plan of the apparatus. Fig. 4 is a side view of one part of the device, and Fig. 5 shows diagrammatically the electrical arrangement of the controller and the connections between it and the batteries and motor. Figs. 6, 7, and 8 are diagrammatic views of a modified arrangement shown in three different stages, as hereinafter described. Fig. 9 shows diagrammatically the controller for use with the modified arrangement; and Figs. 10 and 11 are respectively a side elevation, partly in section, and a front elevation of the controlling apparatus.

Referring to Fig. 1, A is the armature of the motor, and A' the field-magnet of the same. The connection B passes from one pole of the armature to a pole of the main battery C, which in the arrangement shown is divided into two sections to be put either into series or parallel by the controlling device, as hereinafter described. The other connection B' passes first to the small battery D, which I may make of two cells only. The connection B' continues to the other pole of the main battery, passing, however, through the controller shown in the other views. The connections E from the field-magnet pass directly to the small battery D, so that the field-magnet is excited directly by this battery, to which I will refer hereinafter as the "exciter." This exciter is connected to the main battery, so that the current from the latter passes through it in opposition to its own electromotive force, the positive pole of the exciter being connected to the positive pole of the battery. The exciter, if two cells are employed, supplies a current at a pressure of about four volts, considerably larger, however, than this at starting, so that the field-magnet is excited up to the utmost saturation-point. The more energy the starting requires the higher will be the voltage of the exciter on account of all the current supplied to the armature having to pass through the exciter as charging-current. The cells of the exciter do not require to have great capacity, but must be of a kind which will allow a large current to pass through them—that is, into them and out of them—and which will be able to stand great variations in the current. The form of cell I use has the additional advantage of polarizing with very high charging-currents, and the exciter thus automatically chokes off excessive current from the armature, and its own voltage is often in consequence over three volts per cell under the circumstances referred to.

The action of the arrangement is as follows: On the current being turned on to start the motor the full current will pass through the exciter and will cause a sudden generation of gas, polarizing it and resisting the passage of the current for a short time. The full charge of current is thus prevented from passing instantly through the armature of the motor, thus avoiding any undue strain in starting. The current rapidly attains its normal flow and the vehicle increases its motion until it attains the speed desired. This speed depends upon the electromotive force of the current supplied to the armature, and in starting the two parts of the main battery B are placed in parallel, so that for a battery of forty cells the starting electromotive force would be about forty volts. When a higher speed is desired, the battery is placed with its two parts in series, giving a current at eighty volts and doubling the speed of the motor. As will be seen, the current from the main battery has a double path on its way to the motor, one path leading through the exciter and the other through the field-magnet. The resistance to the current is thus reduced, as the exciter and the field-magnet are in parallel with respect to the main circuit. The electromotive force of the exciter must be deducted from the electromotive force of the main circuit, and the current from the main battery is partly used in keeping the exciter fully charged. On the motor increasing in speed beyond the limit set by the controller, owing to the vehicle running downhill or from any other cause, a back electromotive force will be set up in the motor and a current will pass through the main circuit in the opposite direction. This current will be aided by the exciter, which will thus discharge not only through the field, but back into the main battery. As this condition, however, will last only for a short time, there is no danger of the exciter becoming completely discharged. The reverse current will not interfere with the field, as the electromotive force of the current would be decreased in the field-circuit by the electromotive force of the exciter, while the latter will increase the electromotive force of the current passing through it. The exciter will thus continue to supply the current to the field, which will not be reversed. The exciter serves as an electric valve to determine the path of the reverse current.

In conection with this system of motor and batteries I propose to employ a controller of a type which will allow the speed of the motor to be determined and which will also permit of reversal, so as to drive the vehicle backward. Figs. 2 to 5 show such a type of controller; but the details of mechanism are of course unimportant. The controller, as hereinafer described, acts mainly by putting the two parts of the main battery into series or parallel; but exactly the same effect is of course produced by grouping the armature into parts, which may be placed either in series or parallel.

The controller consists of the case F, of insulating material, provided with the rubbing-contacts G. The form of the controller is that of a circular segment, and the contacts are arranged in four circular rows, the sets of contacts being grouped radially. A controlling-lever H is pivoted at $h$ to the lower end of the case, this lever carrying the brushes $h'$ on each side. Two sets of brushes are employed, which when the lever is in operative position bridge over at each side of the controller the contacts which are radially adjacent. The contacts are thus divided into two sets, an inner and outer, one pair of brushes connecting the outer and the other the inner set, as shown in Fig. 2. The curved rim of the controller is provided with the slot J, through which the lever projects, the handle by which the lever is operated being outside the apparatus. At one side of the slot the notches $j$ are provided, which serve to retain the lever in any position to which it is turned. The controller shown contains six positions, in one of which no circuits are formed, the motor being then at rest. This is indicated in Fig. 4 by the dotted line passing through the part containing no contacts. To retain the controller in any one of these positions, a spring-catch $h^2$ is provided, as shown in Figs. 2 and 3. This catch or stop projects into one of the notches, but as it is provided with a spring allows the lever to be pushed by slight exertion into a fresh position. As shown in Fig. 4, on one side of the zero-line there are four radial sets of contacts, which are used for driving the vehicle forward at speeds varying with the set of contacts used. A single set on the left-hand side of the zero-line is employed for driving the vehicle backward.

In Fig. 5 the arrangement of wiring used in the controller is shown diagrammatically, the black circles representing the contact-pieces, and those which are connected directly together are linked in the drawings by black lines. The dotted line passing through each part of the drawings represents the zero position of the controller, as shown in Fig. 4. The arrangement of contacts in Fig. 5 illustrates both sides of the controller, the set at the left being arranged for one side, as shown in Fig. 4, and the set at the right for the other side, which is generally similar. It must of course be noted that contact is simultaneously made by the lever on both sides, so that when connection is made between any pair on one side connection is simultaneously made between the corresponding pair on the other. The letters of reference shown on this figure give the connections between the contacts and the poles of the battery and exciter. The main battery, as shown at the side of the figure, is divided into two parts, the poles of which are marked, respectively, $C+C'-C'$ and $C-$. On connecting $C'+$ and $C'-$ the two parts of the battery will of course be in series, and a high electromotive force will be obtained. On connecting the positive poles together and negative poles together the two parts will be in parallel, and the electromotive force will be reduced to a half. The arrangements of the contacts with relation to the battery and the exciter and also with relation to the field-magnet are shown by the references. As will be seen, the upper pair of contacts only connect with the battery, and consequently with the armature of the motor, while the lower pair are connected to the exciter and to the field-magnet. Those marked $D+$ and $D-$ belong, respectively, to the positive and negative poles of the exciter, and the contacts marked $A'$ are connected with the field-magnet $A$. The reference-letters of the contacts belonging to the battery correspond to those marked upon the poles of the battery in the same figure. The resistances $L$ and $L'$ are placed in the exciter-circuit, so that when the lever is moved over to connect the contacts to the right-hand side of one or both of these resistances the current supplied to the field-magnet will be reduced. On turning the lever from the zero position to the right to start the motor forward connection is made on the left-hand side between contacts marked $C-$ and $C'-$ and between $D-$ and $A'$. On the right-hand side the connections are between $C+$ and $C'+$ and between $D+$ and $A'$. This arrangement puts the two parts of the battery into parallel and of course supplies the field-magnet with current from the exciter. On moving the lever to the second step change is made only in connection with the main battery, the connections of the two upper pairs of contacts being as follows: $C'+$ and $C'-$ on both sides of the controller, thus putting the two parts of the battery into series. The next step does not alter the arrangement of the contacts, but brings into the circuit of the exciter and field-magnet the resistance $L$. This reduces the strength of the field and enables a higher speed to be attained by the motor when the vehicle is running on level ground and great torque is not required in the motor. On turning the lever still further the second resistance $L'$ is also brought into this circuit, still further weakening the field. The stages thus arrived at are as follows:

1. The two parts of the battery are in parallel and a current at an electromotive force of, say, forty volts is supplied to the armature of the motor at the same time the field-magnet is fully excited.

2. The two parts of the battery are placed in series and current at, say, eighty volts is supplied to the armature, doubling the speed of the motor. The field-magnet remains fully excited.

3. The grouping of 2 is not altered, but the strength of the field is reduced, allowing greater speed of the motor to be obtained when the resistance to the motion of the vehicle is not great.

4. A further resistance is brought into the field and exciter circuit.

The variations of speed obtained by weakening the field can of course be also introduced between speeds 1 and 2.

When the lever is turned from the zero position to the left, so as to drive the motor in the reverse direction, the connections are as follows: on the left-hand side from $C-$ to $C'-$ and from $D+$ to $A'$. On the right-hand side they are from $C+$ to $C'+$ and from $D-$ to $A'$. The arrangement of the armature-contacts is thus the same as in the first stage for forward driving, but the current through the field-magnets is reversed. The motor will thus be driven in the reverse direction.

Referring to the arrangement illustrated in the remaining figures, which show another method of carrying out my invention, in which the main battery is not divided in the manner heretofore described, I will first describe the general arrangement of the apparatus, as shown in Figs. 6, 7, and 8.

$C^2$ is the main battery, having a considerable number of cells, and $D'$ is a smaller battery, which serves as an exciter, but is also utilized in certain cases to assist the main battery $C^2$. The connections are altered by means of the controller, which is illustrated in Figs. 9, 10, and 11, so that they can be grouped for forward driving into the positions or stages shown in the general diagrammatic views. In the first stage the connections $M$ and $M'$ pass, respectively, from the armature $A$ to the positive pole of the main battery $C^2$ and to the positive pole of the small battery $D'$. At the same time the connections $N$ and $N'$, belonging to the field-magnets, pass, respectively, to the positive and the negative poles of the small battery. A further connection $O$ connects the negative poles of the large and smaller battery together. The main current from the large battery will thus pass through $D'$ against its electromotive force, going thence to the armature and back to the positive pole of the battery $C^2$. The electromotive force of the main battery will thus be reduced by that of the small one, and a current at a relatively low electromotive force will be supplied to the armature. At the same time the battery D' will supply the field-magnet circuit independently through the connections N and N'. In the second stage of the apparatus (shown in Fig. 7) the small battery D' serves merely as an exciter for the field-magnets and is quite disconnected from the main battery. This forms an independent circuit, including only the armature. In this case the full electromotive force of the large battery is utilized, and a higher speed of the motor is consequently obtained. In the third stage the two batteries are placed in series, so that the combined electromotive force of both is obtained in supplying the current to the armature. The field-magnet is in this case in a shunt-circuit off the small battery D', but is still kept fully excited. The connection O' in this case passes from the negative pole of the main battery to the positive pole of the small battery, so as to complete the circuit. In this latter arrangement the motor attains to an increased speed, owing to the higher tension of the current passing through the armature. Referring, as shown in Fig. 9, to the grouping and connections of the controller which is intended to be used with this modified arrangement, I use a form of apparatus somewhat similar to that already described, but different in detail, as the purpose is not to place the two parts of the main battery in series or parallel, but to place the two batteries which serve in their place in opposition in independence or in series. The radial dotted lines passing through the various contact-bars indicate the different steps or stages of the lever as it is turned to increase or decrease the speed or to release the motor. These lines are numbered, and the lever is normally at the zero-line (marked O) when the vehicle is at rest. The contact bars or pieces are concentric and are marked in the drawings from $a$ to $j$. The operating-bar makes the connection between each pair as follows: $a\,b$, $c\,d$, $e\,f$, $g\,h$, $i\,j$. These letters, however, do not invariably refer to the same connections between the contact-bars and the motor and batteries, as the arrangement of the bars differs in the different steps or stages. When the lever is at the zero-line, no circuits are made, as all the pairs of bars are separate. On turning the bar, however, into the position marked I the connections will be grouped in the form illustrated in Fig. 6. The first pair of brushes on the lever (which is hereinafter described with reference to Figs. 10 and 11) connect the two bars $a\,b$, completing a portion of the circuit, which is shown by the reference-letter N', Fig. 6, the upper bar being connected to the field-magnet and the lower to the negative pole of the small battery. The second pair of brushes connects the second pair of contacts $c\,d$, the upper one of which belongs to the second pole of the field-magnet and the lower to the positive pole of the small battery. The field-magnet circuit is thus completed. This connection corresponds to the letter N in Fig. 6. The third pair of brushes belongs to the armature-circuit connecting the third set of bars $e\,f$, the top one of which belongs to one pole of the armature and the lower to the positive pole of the small battery M', Fig. 6. The fourth connection unites $g\,h$, $g$ belonging to the negative pole of the small battery, and $h$ to the negative pole of the large battery corresponding to the connection O. The bars $i\,j$ form connection between the other pole of the armature and the positive pole of the large battery M, Fig. 6. The second stage leaves the connections $a\,b$, $c\,d$, and $i\,j$ in the same condition; but the bars $g\,h$ are missed, thus breaking the connection between the large and small batteries. $e\,f$ is altered so that the connection of the armature is changed from the positive pole of the small battery to the negative pole of the large battery, corresponding to M' in Fig. 7. The third step still leaves the connections $a\,b$, $c\,d$, $i\,j$, but again alters $e\,f$, which now connects one pole of the armature to the negative pole of the small battery, as shown at M', Fig. 8. $g\,h$ unites the positive pole of the small battery with the negative pole of the large, as at O' in the same figure. The fourth, fifth, and sixth stages introduce, successively, the resistances P, P', and $P^2$ into the field-magnet circuit, so that this is successively weakened, enabling the above-described high speed to be obtained when the resistance to the car is not great. The reversing stage (marked 7 in Fig. 9) gives the following connections, which can easily be traced on the figure: $a\,b$ connects one pole of the field-magnet with the negative pole of the small battery, and $c\,d$ connects it with the positive pole of the same. $e\,f$ forms the connection between the armature and the positive pole of the small battery, $g\,h$ between the negative pole of the small battery and the negative pole of the large battery, while $i\,j$ completes the armature-circuit by a connection between its other pole and the positive pole of the large battery. The arrangement is thus the same as in the first stage, with the exception that the current in the field is reversed.

Referring to Figs. 10 and 11, the actual construction of the controller is shown in detail; but of course it is to be understood that many forms of mechanical construction will serve the same purpose. Q is the base-plate, forming the body of the controller, and on the insulating-plate $q$ the contact-bars R are carried. The letters $a$ to $j$ indicate the relation between the bars in these figures and in the diagrammatic view Fig. 9. The lever S carries the five bridges or pairs of brushes T, which, as shown in Fig. 10, connect the bars in pairs $a\,b$, $c\,d$, $e\,f$, $g\,h$, and $i\,j$. At the upper part of the lever is an arrangement for preventing sparking when the lever is turned from one position to another. The lever is provided with the small handle U, which is pivoted to it and limited in its motion at each side by the double stop $u$, formed by an extension on the lever. The handle is provided with the rubbing contact-pieces $u'$, one at each side, and the forked end $s$ of the lever is also provided with the contact-strips $s'$. When the handle is in its normal position in line with the lever, these contacts are against each other and form part of the circuit, both the handle and lever being provided with the terminals $u^2$ and $s^2$ by means of which the connections are made. When, however, the handle is turned to one side, as shown in Fig. 11, so that it abuts against the stop $u$, the circuit is broken, and the lever can then be pulled over into a new position without danger of sparking from the contact-bars R. When the new position has been attained, the handle is pulled back into its normal position and the circuits are completed. The contact-strips at one side are placed in the field-magnet circuit, and those at the other are in the armature-circuit, so that they are both completed simultaneously or broken simultaneously when the handle is moved. The handle is of course pulled over in the direction in which the lever is to be moved, so that a further pull after the handle meets the stop will move the lever into the desired position.

What I claim as my invention, and desire to secure by Letters Patent, is—

1. In means for controlling electric-motor vehicles, the combination with a motor, a main generator, and a small battery, of a main circuit passing through the main generator, the armature and the small battery in opposition to the electromotive force of the latter, which has one pole permanently connected to the similar pole of the main battery, and an auxiliary circuit comprising the small battery and the field-magnet coils, the two circuits being connected only through the small battery, substantially as described and shown and for the purposes specified.

2. In means for controlling electric-motor vehicles, the combination with a small and large battery, of a motor, connections between the small battery and the field-magnet of the motor, connections between the armature and the main battery and also between the two batteries, and means for altering the connections so that, first, a circuit from the main battery may pass through the small battery in opposition to the electromotive force of the latter; second, the circuit may be independent of the field-circuit; third, may join both batteries in series substantially as and for the purposes specified.

3. In means for controlling electric motors for vehicles, the combination with a main battery divided into two parts which can be placed either in series or parallel, a small battery or exciter, a motor, the current for the armature of which is supplied by the main battery and whose field-magnet is excited independently by the small battery and connections between similar poles of the main battery and exciter so that the main circuit passes through the latter in opposition to its electromotive force of a controlling device to be employed with this arrangement of elements having sets of contact-bars grouped in pairs, one set belonging to the main circuit and the other belonging to the field-magnet circuit, the former being adapted to place the parts of the main battery in series or parallel, and the latter to reverse the current of the field-magnet, and a movable part carrying bridges which connect the said contact-bars in pairs and according to the position of the movable part, first, break both the circuits; second, forming both circuits through the armature and field-magnet coils with the parts of the main battery in parallel; third, place the said parts in series, and, fourth, reverse the motor for back driving by reversing the circuit of the field-magnet, substantially as described and for the purposes specified.

4. In means for controlling electric-motor cars, the combination with a main battery in two parts which can be placed in parallel or series, a small battery and a motor, the field-magnet of which is excited by the small battery and the armature is supplied with current from the large battery, the main circuit passing also through the small battery or exciter, in opposition to its electromotive force of a controlling apparatus consisting of an insulating-base, contact-pieces mounted upon the said base, connections between these contact-pieces and the batteries and motor, a movable part or lever carrying bridges or brushes connecting the said pieces in pairs so that the parts of the main battery may be placed in parallel or series, and resistances connected to the said bars and in the circuit of the field-magnet allowing the field-magnet to be weakened in certain positions of the lever, substantially as described and for the purposes specified.

5. In a controlling apparatus for use with electric-motor vehicles, the combination with an insulating-base, contact-bars carried by the said base, and a lever carrying bridges connecting the said contact-bars, of a handle pivoted at the end of the said lever, contact-pieces carried by the handle and by the lever and adapted when the handle is turned in line with the lever to complete the circuit, connections leading from the contact-pieces and a stop limiting the motion of the handle in both directions, the handle being adapted to make or break the circuit according as it is turned in line with the lever or to either side, substantially as described with reference to the drawings.

In witness whereof I have set my hand in the presence of two witnesses.

HENRY LEITNER.

In presence of—
ALBERT EDWARD ELLEN,
ALBERT A. JORDAN.